US012659312B2

(12) United States Patent
Gapakov

(10) Patent No.: US 12,659,312 B2
(45) Date of Patent: Jun. 16, 2026

(54) AUTHENTICATION REQUESTS

(71) Applicant: DIGITAL FIRST HOLDINGS LLC, Atlanta, GA (US)

(72) Inventor: Timofei Gapakov, Kitchener (CA)

(73) Assignee: DIGITAL FIRST HOLDINGS LLC, Atlanta, GA (US)

( * ) Notice: Subject to any disclaimer, the term of this patent is extended or adjusted under 35 U.S.C. 154(b) by 139 days.

(21) Appl. No.: 18/375,246

(22) Filed: Sep. 29, 2023

(65) Prior Publication Data

US 2025/0112918 A1 Apr. 3, 2025

(51) Int. Cl.
*H04L 9/40* (2022.01)
*G06Q 20/10* (2012.01)

(52) U.S. Cl.
CPC ..... *H04L 63/0876* (2013.01); *G06Q 20/1085* (2013.01); *H04L 63/0807* (2013.01); *H04L 63/0861* (2013.01); *H04L 63/107* (2013.01); *H04L 63/108* (2013.01); *H04L 2463/082* (2013.01)

(58) Field of Classification Search
CPC ............. H04L 63/0876; H04L 63/0807; H04L 63/0861; H04L 63/107; H04L 63/108; H04L 2463/082; G06Q 20/1085; G06Q 20/18; G06Q 20/4014; G07F 19/20; G07F 19/206
See application file for complete search history.

(56) References Cited

U.S. PATENT DOCUMENTS

| | | | | |
|---|---|---|---|---|
| 8,073,461 | B2 * | 12/2011 | Altman | H04L 67/306 455/457 |
| 10,299,118 | B1 * | 5/2019 | Karachiwala | H04L 67/55 |
| 11,068,866 | B1 * | 7/2021 | Hecht | G06Q 20/18 |
| 11,257,067 | B1 * | 2/2022 | Yang | G07F 19/20 |
| 11,354,631 | B1 * | 6/2022 | Hill | G06Q 20/385 |
| 11,443,301 | B1 * | 9/2022 | Hayes | G06Q 20/326 |
| 11,599,619 | B1 * | 3/2023 | Duke | G06F 21/36 |
| 11,704,687 | B1 * | 7/2023 | De Frank | G07F 19/209 705/14.37 |
| 2008/0132251 | A1 * | 6/2008 | Altman | G06Q 30/0268 455/457 |
| 2014/0208400 | A1 * | 7/2014 | Henshaw | H04L 67/04 726/5 |
| 2016/0044019 | A1 * | 2/2016 | Wilkes | H04L 63/0884 726/7 |
| 2019/0164165 | A1 * | 5/2019 | Ithabathula | G06F 21/34 |
| 2020/0019679 | A1 * | 1/2020 | Asghari-Kamrani | G06Q 20/4014 |
| 2024/0354841 | A1 * | 10/2024 | Velline | G06Q 40/02 |

* cited by examiner

*Primary Examiner* — J. Brant Murphy
(74) *Attorney, Agent, or Firm* — Notaro, Michalos & Zaccaria P.C.; John S. Economou

(57) ABSTRACT

A method and a communication network are disclosed. The method comprises detecting, by a computing device of a trusted computing system, an input event indicating that an individual at the computing device wishes to authenticate their identity, responsive to said detecting, determining, by the computing device, at least one property for an authentication request that enables an authentication provider module that is external to the trusted computing system to authenticate the identity of the individual independently of the trusted computing system, and responsive to said determining, generating, by the computing device, the authentication request, wherein the authentication request comprises data indicative of said at least one property.

20 Claims, 6 Drawing Sheets

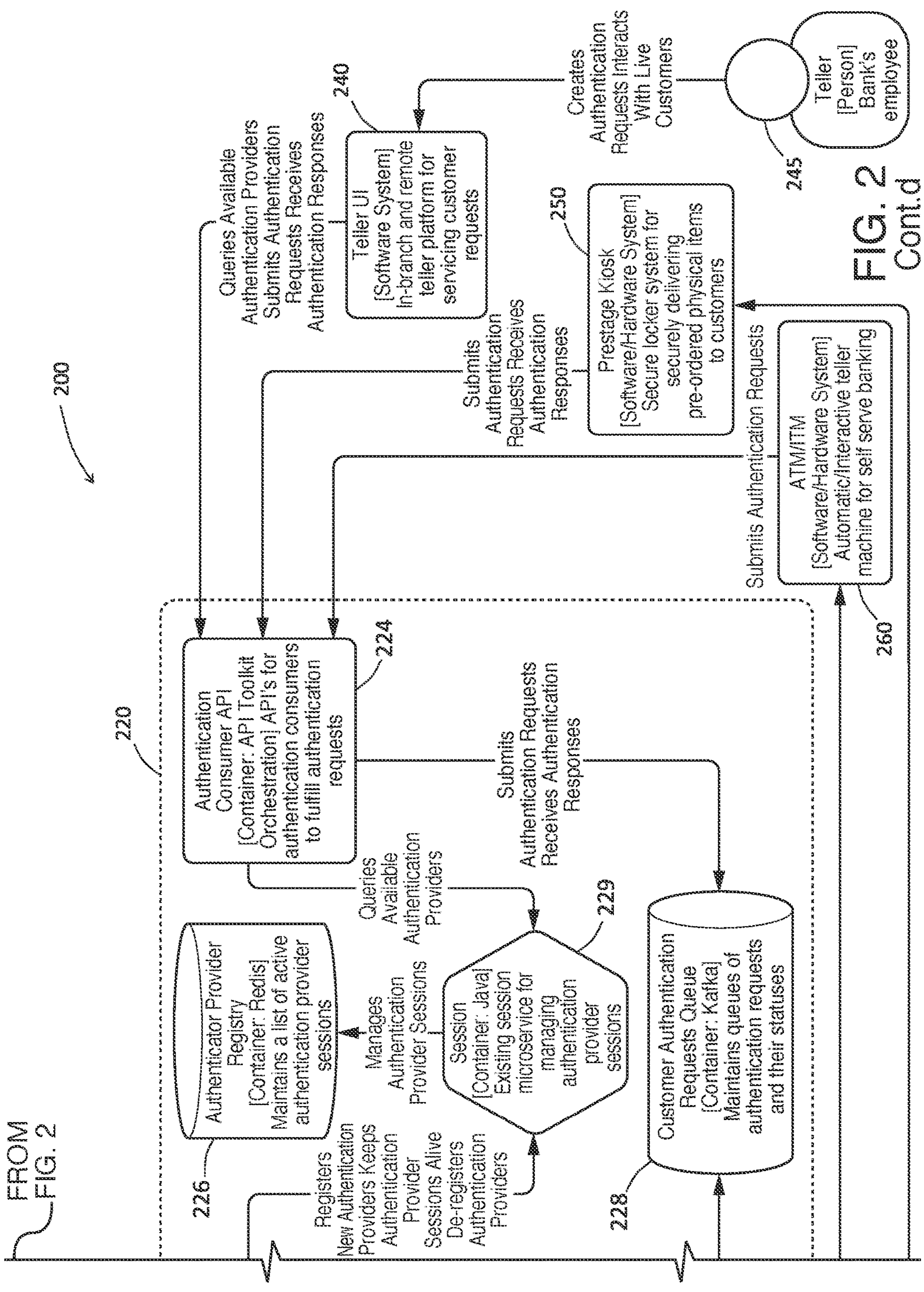
FIG. 2 Cont.d

AUTHENTICATION REQUESTS

FIELD OF THE INVENTION

The present invention relates to a method and a communication network for generation of authentication requests. In particular, but not exclusively, the present invention relates to a methodology in which an authentication request is generated by an ATM or kiosk or the like and the authentication request includes an indication of properties that enable an authentication provider module, that will be responsible for authenticating an identity of an individual, to fulfil the authentication request based on the properties of the request.

BACKGROUND

In a banking or retail environment, it is well known that an individual must authenticate themselves before they are able to perform a transaction. For example, an individual must be able to verify their identity before they are able to withdraw funds from their bank account. This authentication of an individual's identity happens regardless of whether the transaction is taking place at an Automated Teller Machine (ATM), a kiosk, in-branch at a physical teller or when communicating with a remote teller using an Interactive Teller Machine (ITM).

Typically, anyone with a credit card or debit card can access transaction services at these locations by authenticating themselves by providing their bank card and a PIN only known to them. When using an in-branch or remote teller, physical ID may also be provided as further verification of the individual's identity.

However, there are occasions when a customer only has access to their mobile device but does not have access to their banking cards or any forms of physical identification to enable them to perform transactions. In these situations, they are left unable to perform transactions. This is undesirable for customers. Additionally, when scanning an ID card at an ITM, the authentication process is time consuming and there are occasions when an ID card is left in the scanner. This scanning process also necessitates ID scanner hardware on the ITM and there are also privacy concerns with sending scanned images of a customer's ID.

To date, there has been no technical implementation that enables a customer to efficiently conduct cardless authentication by making use of a device in their possession to authenticate their identity at a terminal. The present inventor has recognised that it is possible to make use of an authentication provider that is able to independently authenticate an individual's identity and then authenticate this authentication provider with a trusted computing system. However, there is a risk that if authentication requests (which the authentication providers can respond to) do not include specific properties, they may not be able to be fulfilled by the authentication providers.

SUMMARY

It is an aim of the present invention to at least partly mitigate one or more of the above-mentioned problems.

It is an aim of certain embodiments of the present invention to help provide a methodology for generating an authentication request.

It is an aim of certain embodiments of the present invention to help ensure authentication requests are generated with the relevant information so that the requests can be fulfilled by an authentication provider.

It is an aim of certain embodiments of the present invention to help generate authentication requests that can then be used by an authentication provider to authenticate an identity of an individual independently of a trusted computing system.

It is an aim of certain embodiments of the present invention to help provide authentication providers. These providers can be pre-registered with a trusted computing system, and allow the authentication providers to authenticate customers whilst the trusted computing system only authenticates the authentication providers. In this way, authenticating customers is offloaded to authentication providers, which abstracts out the process of customer authentication and only requires trust between a trusted system and a customer authentication provider. This may be described as we trust you and you authenticate your customer, which means we trust the information about your customer that you provide us.

According to a first aspect of the present invention there is provided a computer-implemented method for generating an authentication request for authenticating an identity of an individual, comprising the steps of: detecting, by a computing device of a trusted computing system, an input event indicating that an individual at the computing device wishes to authenticate their identity; responsive to said detecting, determining, by the computing device, at least one property for an authentication request that enables an authentication provider module that is external to the trusted computing system to authenticate the identity of the individual independently of the trusted computing system; and responsive to said determining, generating, by the computing device, the authentication request, wherein the authentication request comprises data indicative of said at least one property.

Aptly, the method further comprises determining a request identifier for the authentication request as one property of said at least one property.

Aptly, the method further comprises determining the request identifier by receiving the request identifier from a server of the trusted computing system.

Aptly, the method further comprises determining a terminal identifier of the computing device as one property of said at least one property.

Aptly, the method further comprises determining the terminal identifier by querying a memory of the computing device for the terminal identifier.

Aptly, the method further comprises determining a date and time of expiry for the authentication request as one property of said at least one property.

Aptly, the method further comprises determining the date and time of expiry as a predetermined time period after generating the authentication request.

Aptly, the method further comprises determining a customer identifier for the authentication request as one property of said at least one property.

Aptly, the method further comprises determining the customer identifier responsive to inputting information associated with the individual into a user interface of the computing device.

Aptly, the method further comprises determining an authentication provider module identifier as one property of said at least one property.

Aptly, the method further comprises determining the authentication provider module identifier responsive to inputting an indication of a selected authentication provider module into a user interface of the computing device.

Aptly, the method further comprises determining at least one required attribute as one property of said at least one property.

Aptly, the method further comprises determining the at least one required attribute as one or more of: the authentication provider module is provided by a same entity as the trusted computing system; the authentication provider module requires a minimum password difficulty for authentication of the identity of the individual; the authentication provider module is able to perform multi-factor authentication of the identity of the individual; and the authentication provider module is able to provide geolocation information for the individual.

Aptly, the method further comprises determining the at least one required attribute based on a type of transaction being performed at the computing device and/or a type of the computing device.

Aptly, the method further comprises determining a minimum required trust level score as one property of said at least one property.

Aptly, the method further comprises determining at least one required action to be performed by the authentication provider module during authentication of the identity of the individual as one property of said at least one property.

Aptly, the method further comprises determining the at least one required action as one or more of: the authentication provider module must require input of a password; and the authentication provider module must perform multi-factor authentication.

Aptly, the method further comprises detecting the input event comprises receiving a selection by the individual or a bank teller on a user interface of the computing device.

According to a second aspect of the present invention there is provided a communication network, comprising: a trusted computing system comprising a computing device; a non-trusted computing system comprising at least one authentication provider module configured to authenticate an identity of an individual independently of the trusted computing system; wherein the computing device is configured to: detect an input event indicating that an individual at the computing device wishes to authenticate their identity; determine at least one property for an authentication request that enables the authentication provider module to authenticate the identity of the individual independently of the trusted computing system; and generate the authentication request, wherein the authentication request comprises data indicative of said at least one property.

Aptly, the computing device is an Automated Teller Machine or Self-Service Terminal or kiosk or is a desktop computer, laptop, or mobile device operated by a bank teller.

Certain embodiments of the present invention help offload authentication of customers to authentication providers, which abstracts out the process of customer authentication and only requires trust between a trusted system and a customer authentication provider.

Certain embodiments of the present invention help provide a communication network and associated methodology in which authentication requests are generated which can be used by authentication providers to authenticate an individual's identity independently of a trusted computing system.

Certain embodiments of the present invention help provide a methodology for generating authentication requests with certain properties that enable the authentication request to be fulfilled by an authentication provider.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
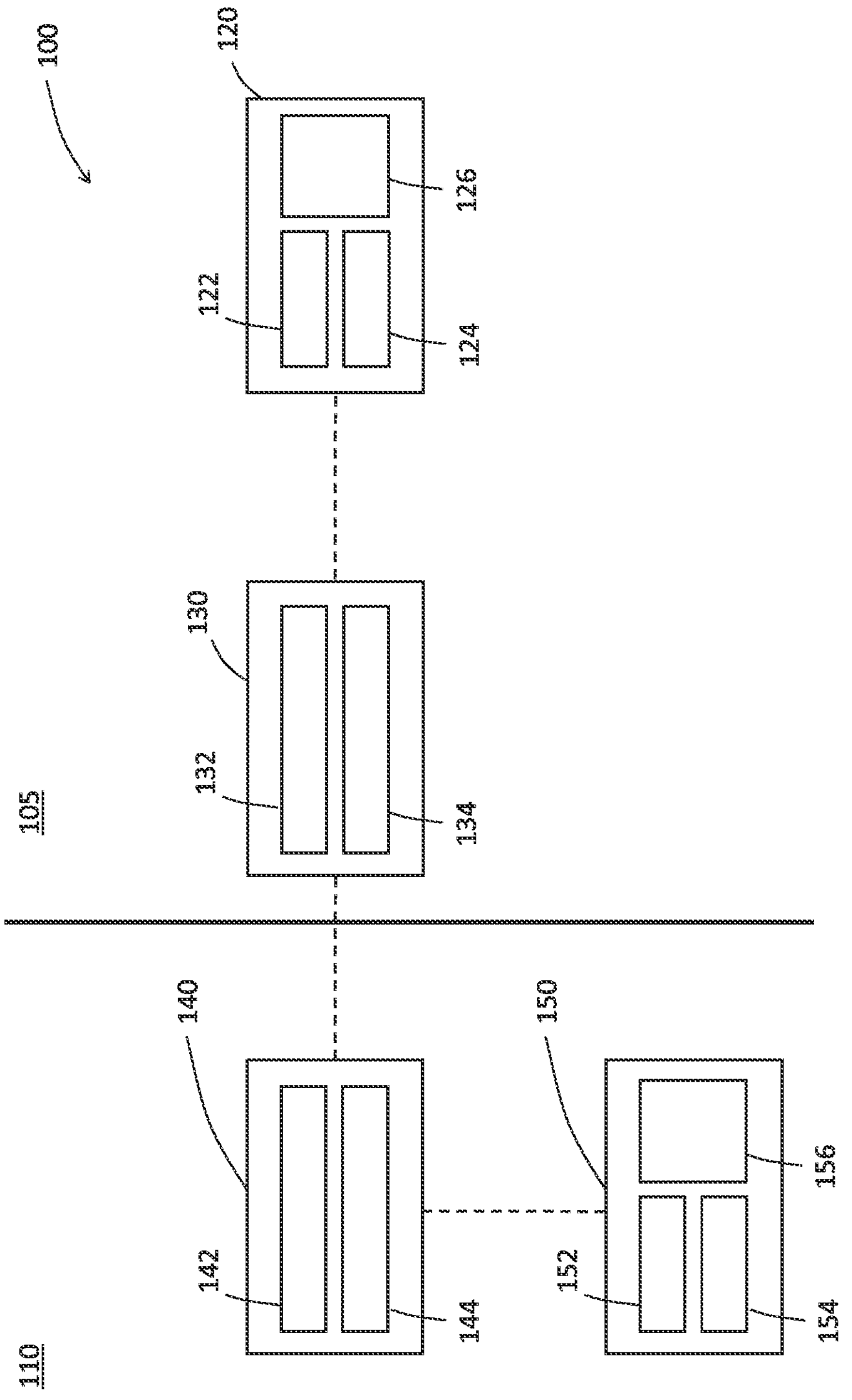
FIG. 1 illustrates a communication network.

FIG. 1 illustrates a communication network 100. In the communication network 100 there is a trusted computing system 105 and a non-trusted computing system 110. By "trusted" it is meant that the components within this system all have an internal authentication token that can be used to authenticate that component as part of the trusted system. The designer of the system also has internal control over operation of the components in the system. By "non-trusted" it is meant that the components within this system do not have an internal authentication token and thus cannot be trusted unless they are able to provide a specific authentication token that they have been provided with by the trusted system (i.e., they have been pre-registered by the trusted system). The non-trusted system is also external to the trusted system and may have been developed by a third-party so the designer of the trusted system has no control over the operation of this system. The trusted computing system 105 includes a first computing device 120 and a server 130. It will be appreciated that more than one first computing device and more than one server may be present in the trusted computing system. In the non-trusted computing system 110, there is a second computing device 140 and a mobile device 150 of an individual. It will be appreciated that more than one second computing device and more than one mobile device may be present in the non-trusted computing system. The first computing device may be a Self-Service Terminal or an Automated Teller Machine or a kiosk. The first computing device may also be a desktop computer or laptop or mobile device of a bank teller. The bank teller may be either in-branch or remote from the branch. If the first computing device is an ATM, the ATM may or may not be an Interactive Teller Machine (ITM).

The first computing device 120 includes one or more processors 122, at least one memory 124 and a display 126. The memory is a non-transitory computer-readable storage medium. The memory 124 stores executable software that is executable by the processors 122 of the first computing device. The display 126 displays a graphical user interface for enabling a user of the device to enter details and select options. The first computing device may also include a communication interface (not shown) for communicating with the server 130. Where the first computing device is an ATM, the computing device may also include an encrypted PIN pad (not shown), a note dispenser (not shown), a receipt printer (not shown), a card slot (not shown) for insertion of a user's bank card, a camera (not shown), a barcode reader (not shown), a microphone (not shown), speakers (not shown) or the like as will be appreciated by a person of skill in the art. When the ATM is an ITM, the ATM may further include additional functionality. For example, the ITM may include a signature pad (not shown), an ID scanner (not shown), a telephonic handset (not shown), a wired headset (not shown), a tactile keyboard (not shown), a beamforming microphone (not shown) or the like as will be appreciated by a person of skill in the art. This hardware may not be present on a conventional non-ITM ATM. The ITM may also have functionality to enable an audio and video communication link to be established with a remote teller device. This functionality may not be present on a conventional non-ITM ATM.

The server 130 also includes one or more processors 132 and at least one memory 134. The memory 134 is also a non-transitory computer readable storage medium. The memory 134 stores executable software that is executable by the processors of the server. The server may also include a communication interface (not shown) for communicating with the first computing device and the second computing device.

The second computing device 140 also includes one or more processors 142 and at least one memory 144. The memory 144 is also a non-transitory computer readable storage medium. The memory 144 stores executable software that is executable by the processors of the second computing device. The second computing device may also include a communication interface (not shown) for communicating with the server and the mobile device. The second computing device may for example be a server but it could be any device that is able to authenticate an individual and send an authentication response to the trusted system.

The mobile device 150 of the user is for example a smartphone or tablet or the like. The mobile device 150 also includes one or more processors 152, at least one memory 154 and a display 156. The memory 154 is also a non-transitory computer readable storage medium. The memory 154 stores executable software that is executable by the processors of the mobile device. The display 156 also displays a graphical user interface. The mobile device may also include a communication interface (not shown) for communicating with the second computing device.

The components of the trusted and non-trusted computing devices may communicate with one another via a network (not shown). The network may be wired, wireless or a combination of wired and wireless. For example, the network may be the internet.

Figure 2:
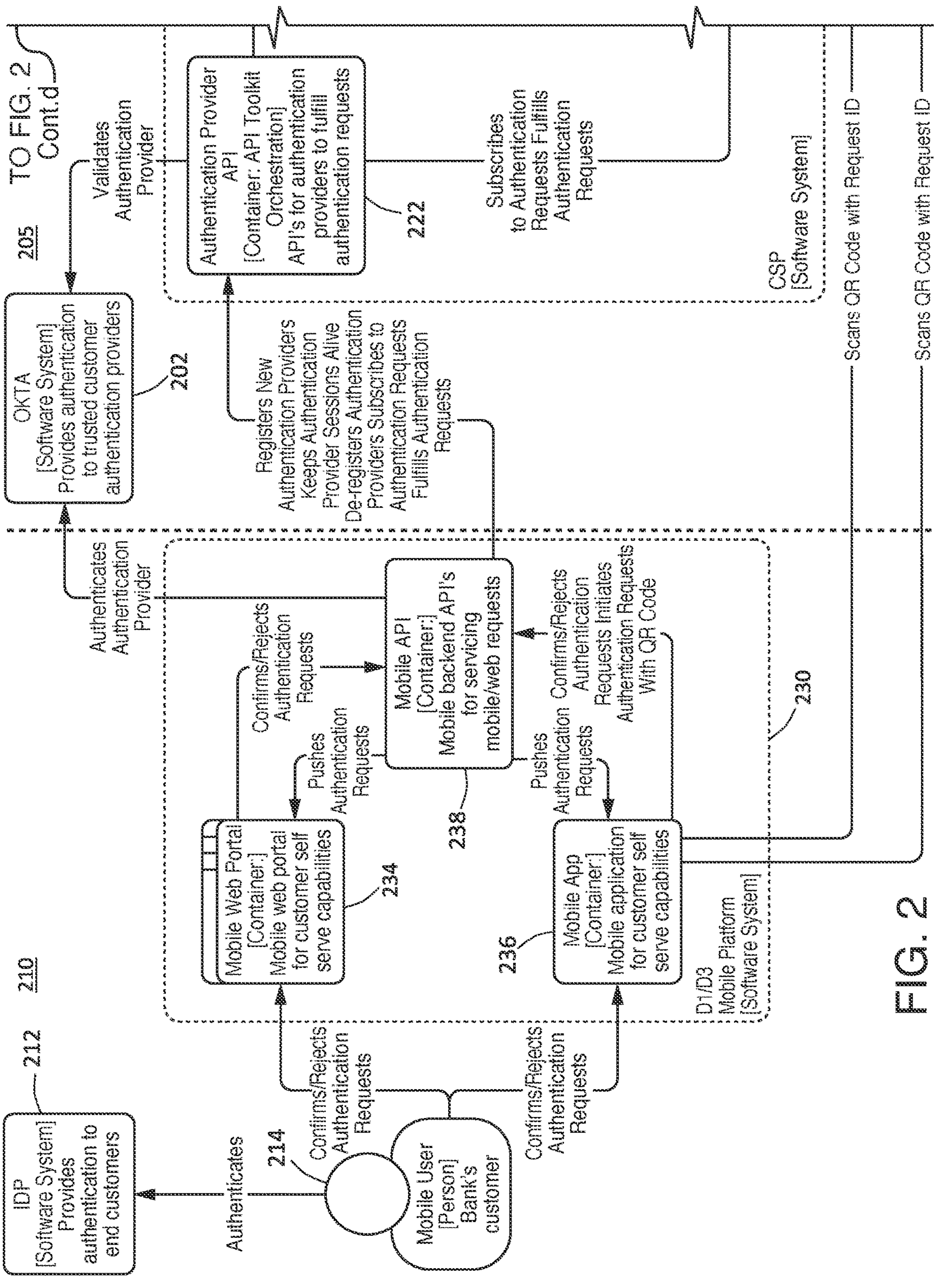
FIG. 2 illustrates components of a communication network.

FIG. 2 illustrates components of a communication network 200 along with their users in more detail. The network may be similar to that shown in FIG. 1. In the network 200, there is a trusted computing system 205 and a non-trusted computing system 210 (separated by the dotted line). Reference is made below to Customer Authentication Providers (CAPs) and Customer Authentication Consumers (CACs). A CAP may also be referred to as an "authentication provider". A CAP is at least one software module that is used to authenticate an identity of an individual independently of the trusted system and that executes on a computing device that is external to the trusted system. In some embodiments, a CAP may also be a combination of at least one hardware module and the at least one software module. Particularly, the computing device on which the software module(s) is/are executing may form part of the CAP (e.g., in the case of a retina scanner). A CAP is responsible for authenticating itself to the Channel Services Platform's (CSPs) identity provider, Okta (discussed below), and then registering itself as a CAP with the CSP and announcing itself via keep alive pings. Further, this component is responsible for monitoring the authentication request queue for authentication requests matching its own capabilities and fulfilling them. A CAC is any component (hardware and/or software) that submits authentication requests and receives authentication responses.

In FIG. 2, the CSP 220 is the main component of the trusted system. The CSP is the Channel Services Platform. This component represents an existing platform that hosts many services in order to enable various cross channel financial transactions. This platform is responsible for authenticating CAPs and CACs and hosts APIs through which CAPs and CACs interact. The mobile platform 230 is the main component of the non-trusted system. The mobile platform represents an external system (external to CSP) that hosts CAPs as well as systems of interaction for the customer. It is ultimately responsible for authenticating and trusting mobile users/customers.

Focusing first on the non-trusted system, there is a component labelled IDP 212. The IDP is the external system's identity provider. This component represents the system to which end customers authenticate. This identity provider is considered external/foreign to the Channel Services Platform (CSP) system (described below) and tokens from this provider will not be recognized or trusted by the CSP system. However, this identity provider is used to authenticate end customers to their own mobile platform. CSP then establishes trust with the mobile platform itself, rather than end customers or the external IDP 212. More generally, this component represents any means by which an external system (mobile platform in this example) is able to effectively authenticate their end users. In more detail, IDP 212 is able to provide a mobile device of mobile user 214 with an authentication token that the mobile device can then provide to an authentication provider (e.g., Mobile API 238) when needed to authenticate the identity of the individual (mobile user). This token may be issued by IDP 212 when the mobile device first requires it and then the token may then be used on multiple occasions each time the mobile device needs to perform authentication. The token may have also have an expiry period and so a new authentication may need to be obtained from IDP 212 from time to time.

A mobile user 214 is shown using part of the non-trusted system. This component represents the end customer, the user who needs to be authenticated at various points of interaction/channels. Mobile user authenticates themselves via the external IdP 212, which makes them a trusted user of the mobile app and web portal. This user may also interact with ATM/ITMs and Prestage Kiosks/Lockers for the purpose of scanning QR code or using OTPs to prove their identity and to then further perform required transactions. This user also interacts with a bank teller who is either at the branch or who is located remotely from the branch (e.g., using Interactive Teller functionality on an ITM).

Within the mobile platform 230 there is a mobile web portal 234, a mobile app 236 and a mobile Application Programming Interface (API) 238. The web portal 234 may execute on a mobile device of the mobile user. This component represents a system of interaction through which a customer may perform various self-serve operations, including authentication and confirmation of identity. The mobile web portal may also allow step up authentication through one time passcodes sent via SMS or email. The mobile app 236 may also execute on a mobile device of the mobile user. The app may be used as an alternative to the web portal. This component represents a system of interaction through which a customer performs various self-serve operations, including authentication and confirmation of identity. The mobile app may also allow step up authentication and biometric authentication, depending on the capabilities of the mobile device. The mobile API 238 represents the backend of the external system which establishes trust with the mobile user/customer. This component represents a trusted Customer Authentication Provider (CAP). As discussed above, this component may be responsible for authenticating itself to the CSP's identity provider, Okta (discussed below), and then registering itself as a CAP and announcing itself via keep alive pings. Further, this component is responsible for monitoring the authentication request queue for authentication requests matching its own capabilities and fulfilling them.

Turning now to the trusted part of the communication network, there is shown a component labelled Okta 202. This component represents a CSP trusted identity provider. Once vetted, the CAP is issued credentials in Okta such that it can authenticate itself and obtain a trusted authentication token that will then be used to connect to CSP and fulfil authentication requests. The token issued to CAP will contain claims that will indicate various information about CAP, including the level of trust, step up capabilities, etc. In more detail, Okta 202 is able to provide an authentication provider such as Mobile API 238 with an authentication token that the authentication provider can then provide to CSP (executing on a server) when needed to authenticate the authentication provider. This token may be provided to CSP initially when the authentication provider pre-registers itself with CSP and also each time the authentication provider sends an authentication response to the CSP. This token may be issued by Okta 202 when the authentication provider first requires it and then the token may then be used on multiple occasions each time the authentication provider needs to perform authentication. The token may have also have an expiry period and so a new authentication may need to be obtained from Okta 202 from time to time.

Within the CSP 220 there is an Authentication Provider Application Programming Interface (API) 222, an Authentication Consumer Authentication Programming Interface (API) 224, an Authentication Provider Registry 226, a Customer Authentication Request (and Response) Queue 228 and a Session Service 229. The Authentication Provider API 222 represents an API that is hosted by CSP and enables CAPs to register themselves, keep the session alive, subscribe to be notified of new authentication requests, and fulfil applicable authentication requests. To access this API, CAP has to provide a valid token from Okta. The Authentication Consumer API 224 represents an API with which (CACs) can interact. This API is hosted by CSP and allows CACs to query available CAPs, submit authentication requests, and receive authentication responses. To consume this API, a regular internal CSP token is required. The Authentication Provider Registry 226 represents a datastore of currently active and available CAPs. Once CAP's register themselves and connect to CSP via the Authentication Provider API, they maintain a ping to keep their session alive and to indicate that they are available to take on authentication requests. The active sessions are stored in this registry and are retrievable by CACs. The Customer Authentication Request (and Response) Queue 228 represents a queue of pending customer authentication requests as well as a queue of fulfilled authentication responses. Once a CAC generates an authentication request, it is put in the pending authentication request queue. Various CAPs subscribe to this queue to be notified of new requests. The queue can be further segregated by request type such that only relevant CAPs are notified of requests that they are able to fulfil. Once a CAP is notified, it will take the request from the queue, fulfil it and place an authentication response on the response queue, referencing the original request. CACs subscribe to the response queue and get notified once new responses are available. CACs monitor the queue for relevant responses matching the requests that they've submitted. The Session Service 229 represents an internal CSP service that is used to maintain CAP sessions by interacting with the Authentication Provider Registry. This is a utility microservice.

Also part of the trusted system is a Teller User Interface (UI) 240, a Prestage Kiosk 250, and an ATM/ITM 260. The teller UI represents a system of interaction that Teller users leverage while servicing a customer in the branch. This system also represents the tool that remote tellers will leverage while interacting with remote customers via an ITM. Teller UI is a CAC-responsible for generating and submitting customer authentication requests in order to authenticate the customer in the branch. A teller 245 is shown in FIG. 2 using the Teller UI. The teller represents a user, a person, who is interacting with Teller UI. This person physically interacts with the customer and then produce authentication requests via the Teller UI tool. The Prestage Kiosk 250 and ATM/ITM 260 are other systems of interaction with which a customer/mobile user can interact. The Prestage Kiosk or ATM/ITM may generate a unique, short lived QR code that the customer may scan with their mobile device. The QR code can open the relevant mobile banking app/web portal and allow the customer to authenticate. Prestage Kiosk and ATM/ITM are examples of a CAC-they generate authentication requests and receive authentication responses once the customer confirms their identify via the mobile app/web portal after having scanned the QR code. It is noted that instead of a QR code, an OTP may also be provided to the user for manually inputting into the banking app/web portal for authentication of the user.

Figure 3:
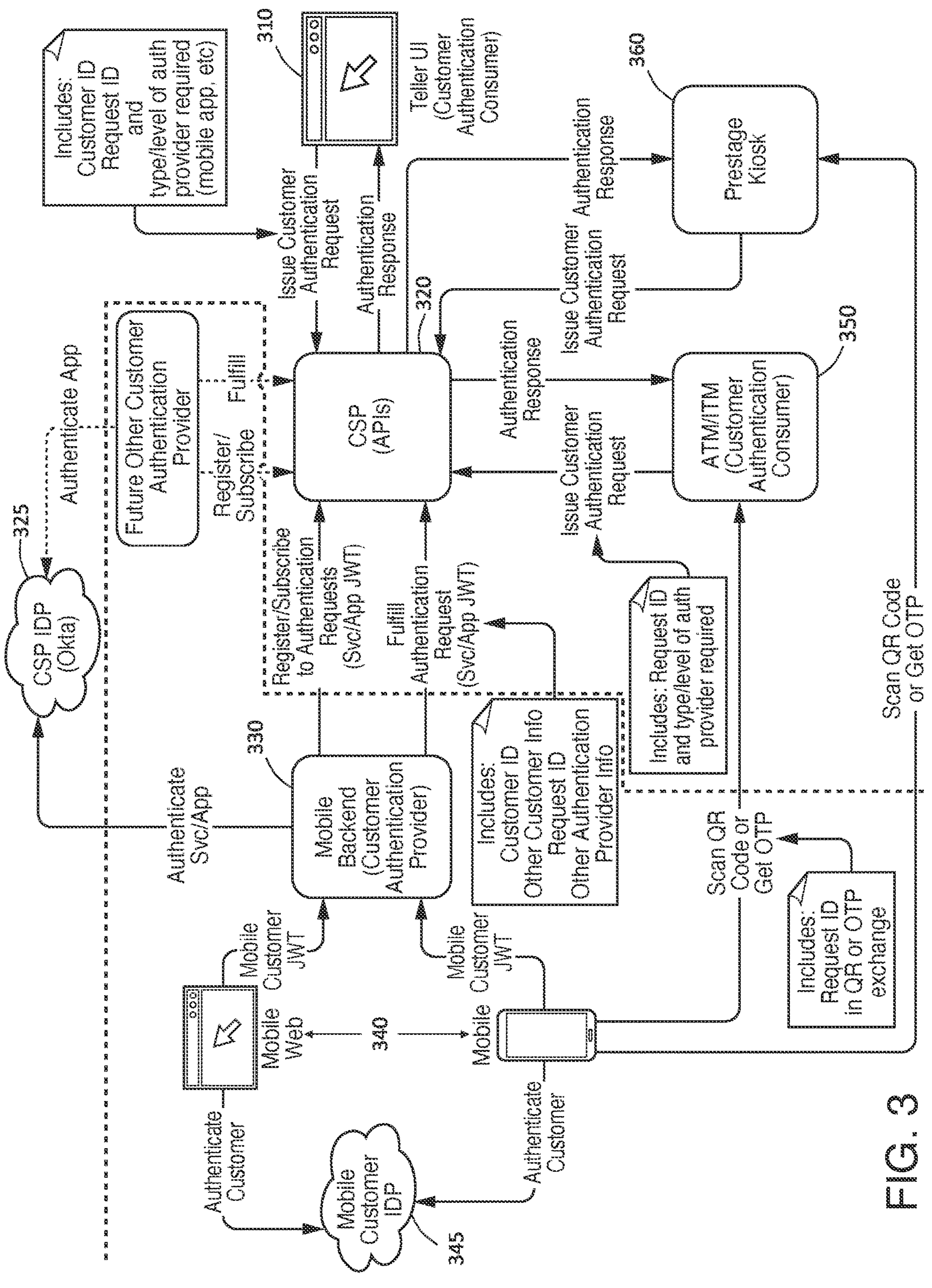
FIG. 3 illustrates interactions between components of a communication network.

Processes for cardless authentication of an identity of an individual will now be described with respect to FIG. 3. First, a process that may take place when a user/customer arrives in branch and speaks to a bank teller is described. Firstly, the customer arrives at a physical financial institution branch and proceeds to a teller. The teller asks the customer to present physical identification (bank card, driver's license, etc). Then the customer informs the teller that they do not have documents with them and would like to proceed with cardless authentication. Following this, the teller asks the customer their name and searches for the customer by name in Teller UI system 310. Once a possible match is found, the teller selects the customer in the list and initiates a cardless authentication flow. This is detected as an input event on the teller machine indicating that the individual is to be authenticated via a cardless authentication process. The Teller UI system queries the CSP 320 to obtain a list of currently available customer authentication providers (CAPs) and displays them to the teller on the Teller UI 310. The next steps are now described on the presumption that a mobile banking application is in the list of available CAPs. If this is the case, the teller asks the customer if they are a mobile banking user and if so would they like to confirm their identity using the mobile banking app. If the customer confirms that they are a mobile banking user, the teller selects mobile app as the preferred CAP to authenticate the customer. The Teller UI system 310 then generates a new customer authentication request which includes the selected CAP, the customer's name and ID from the banking core system (or some other universal customer ID). The request also populates additional required attributes that the CAP must meet, such as trust level, whether MFA (multi factor authentication) is required, etc. The request also contains information about the physical branch and the nature of the request. The request is then transmitted to the CSP 320 and given an authentication request ID and then added to the authentication request queue. At the same time, the mobile application backend system 330 is monitoring the request queue and sees a request that matches its own capabilities. Specifically, this particular request is requesting this specific CAP (mobile app), because the customer indicated that as their preferred way to authenticate. The CAP therefore picks up the request from the queue and generates a push notification to the customer's device 340. The customer is selected based on the customer identifier that was included in the authentication request. The customer that is in the branch receives a push notification from their mobile banking app. If the customer is not already signed into their mobile app, then the app prompts them to sign in as per the usual mobile app process. The notification asks the customer if they are requesting to be authenticated at a physical branch, specifying the details of the branch. The customer then acknowledges the request, confirming that they are indeed requesting to authenticate at that branch. If the original request had also indicated that MFA is required, the mobile application proceeds to ask the customer to do a face scan or finger scan, depending on what the customer had previously configured in the mobile application. The mobile application on the mobile device 340 then submits the confirmation that the customer has approved this request to the mobile backend (CAP) 330. This includes providing the authentication token obtained from the mobile customer IDP 345 (described with respect to FIG. 2). The mobile backend (CAP) then generates a new customer authentication response, referencing the original authentication request ID, and providing a customer ID as well as other relevant customer information, also indicating that the customer has approved the authentication request and has performed MFA (if that was required in the request). This authentication response is then submitted into the response queue on the CSP 320. The response includes the authentication token that was obtained by the CAP from Okta 325 (described in relation to FIG. 2). The API that accepts such responses verifies the token from the CAP (by communicating with Okta 325—described with respect to FIG. 2), making sure that this CAP is entitled to submit responses with the provided attributes (trust level, MFA performed, etc). The teller UI application (backend) is monitoring the response queue for responses matching its initial request ID. Once it sees this response come in, the teller UI application is notified with the details of the response. The teller UI then notifies the teller that the customer has been authenticated and that it is indeed the correct person that was initially searched and found by the teller in the system. The bank teller then proceeds to bring the customer into session as usual and perform requested transactions.

Now, a process that may take place when a user/customer arrives at an ATM/ITM 350 or pre-staged kiosk/locker 360 is described. It is noted that the steps described in this process are similar for any terminal with a screen and ability to communicate with the CSP cloud platform. As such, in the following description, an ATM is used as an example, but the process is applicable to ATM, ITM and Prestage Kiosk flows or the like. Firstly, a customer walks up to an ATM and is presented with multiple menu options and instructions. One such option is cardless authentication. If the customer does not have their bank card with them, they select cardless authentication. This selection is detected as an input event by the ATM indicating that the individual is to be authenticated via a cardless authentication process. The ATM then communicates with the CSP to obtain a new authentication request ID. The ATM then generates a new customer authentication request. The request is a set of data including various pieces of information including the request ID for the request and a device ID for the ATM. This request is anonymous since the ATM does not know who the person standing in front of them is. However, the request may specify the minimum trust level of the CAP required and that MFA must be performed when authenticating this customer. The ATM then transmits the request to CSP 320 and the request is added to the request queue. The request queue is being monitored by the mobile backend 330. At the same time, a QR code is generated that is shown on the screen of the ATM. It is noted that a One-Time Passcode (OTP) could also be displayed on the screen in addition to or instead of the QR code. The QR code contains a link to the mobile app/web portal and also contains the ID of the authentication request that was just submitted by the ATM. In some embodiments, this request is short lived with no more than a couple of minutes of validity for security reasons. Once the QR code is displayed, the customer scans the QR code with their mobile device (e.g., phone). The mobile device then launches the mobile banking app that is configured to launch when a specific website is requested. The URL in the QR code instructs the mobile app to start a mobile authentication flow with the provided request ID (in the QR code). If the customer is not already signed into their mobile app, then the app prompts them to sign in as per the usual mobile app process.

It is noted that if the customer wishes to use the OTP instead of the QR code, the user alternatively signs in to their mobile app, selects the cardless authentication at ATM option, and then inputs the OTP into the mobile app together with the request ID. Once signed into the app, the app submits the received request ID to the mobile backend 330, which in turn queries the request queue on the CSP 320 for a request matching this ID. The app also provides the authentication token obtained from the mobile customer IDP 345 (described with respect to FIG. 2). The mobile backend 330 then retrieves the request with the correct ID from the queue and makes sure that the parameters of the request match its own capabilities (trust level, MFA abilities, etc). The mobile backend may also validate that the request has not expired. The mobile backend 330 may also retrieve ATM information from the request (such as the location). The mobile backend 330 then displays a notification on the mobile device of the customer asking them if they are attempting to authenticate at the specific ATM, whilst providing the location of the ATM. The customer is then able to confirm in the app that they are indeed trying to authenticate at that ATM. Furthermore, if the request contained a requirement for MFA, the app asks the customer to scan their face or finger before proceeding. Once the customer confirms they are trying to authenticate and performs any necessary MFA, the mobile app then sends confirmation to then mobile backend 330, which then generates a new customer authentication response. The response contains core customer identifier (or some other universal customer ID), as well as other customer details, including the fact that MFA was performed. The response also contains the original request ID. The response includes the authentication token that was obtained by the CAP from Okta 325 (described in relation to FIG. 2). Once the token is verified by the CSP, this authentication response is then submitted into the response queue on the CSP 320. The API that accepts such responses verifies the token from the CAP, making sure that this CAP is entitled to submit responses with the provided attributes (trust level, MFA performed, etc). The ATM (or rather ATM backend services) is monitoring the response queue and when the response is added it receives the authentication response and notifies the ATM that the customer has been authenticated, providing customer's details to the ATM. Then, the ATM presents new menu options to the customer to proceed with regular ATM transactions.

In the case of a customer making use of an ITM and communicating with a remote teller, the authentication process is conducted as follows. Firstly, a customer walks up to an ITM and is presented with multiple menu options and instructions. One such option is to speak with a remote teller. If the customer selects this option a communication link is established with a remote teller. The remote teller asks the customer to present physical identification (bank card, driver's license, etc). Then the customer informs the teller that they do not have documents with them and would like to proceed with cardless authentication. The remote teller then has two options. Either they can proceed in a similar manner as set out above for authentication at an in-branch teller by asking the customer their name etc. and then generating and submitting an authentication to CSP. Alternatively, they can send instructions to the ITM such that a QR code and/or OTP is displayed on the ITM. In that case, the authentication proceeds in a similar manner as set out above in relation to authentication at an ATM or kiosk. However, in both of these cases, the authentication response is returned to the remote teller's computing device to authenticate the identity of the individual. After authentication, the remote teller is then able to assist the user with their transaction.

As noted above, Customer Authentication Consumers (CAC) generate authentication requests. These requests include a set of data indicating certain information associated with the request. The requests contain information describing who can fulfil them. The requirements for fulfilling a request may be risk based and/or capability based and/or customer preference based. The following is an example of potential properties a request may contain:

- Request ID
- CAC ID
- Issue Date/Time
- Expiry Date/Time
- Request Additional Details—optional
  - Description—purpose of this request to show to the customer
  - Location—ex branch or ATM location
  - Secret—may be used as additional verbal OTP
- Customer ID—optional
- Required CAP ID—optional if specific CAP is requested, ex: mobile banking app
- Required CAP Capabilities/Roles—optional
  - Internal to NCR
  - MFA light
  - MFA biometric
  - Geolocation
  - Etc
- Required CAP Trust Score—optional
- Required CAP Actions—optional, actions CAP must perform prior to fulfilling a request
  - Perform MFA
  - Prompt for password
  - Etc The following is an example of potential properties a response may contain:

- Response ID
- CAP ID
- Request ID—request ID to which this is a response
- Issue Date/Time
- Customer Details
  - Customer ID
  - etc.
- Actions Performed—optional, required if request contained "Required CAP Actions" that needed to be performed.

It is also noted that various criteria can be used to classify Customer Authentication Providers. Before credentials are issued to a potential CAP, they must go through a vetting process in order to determine the eligibility as well as trust level. Once this vetting process is complete, credentials can be issued to this CAP and the resulting tokens (after authentication) will contain information about the capabilities of this provider.

Some of the inputs used to determine the eligibility and the trust level of a provider are:

| Criteria | Required? | Weight |
|---|---|---|
| Is provider internal to NCR? | | 20 |
| Is provider enforcing minimum password difficulty requirements? | Yes | |
| Does provider offer MFA via SMS or Email? | | 5 |
| Does provider offer MFA via biometrics? | | 20 |
| Does provider offer geolocation information? | | 10 |
| Does provider require re-authentication regularly (TBD)? | | 5 |

Using the criteria above, a potential CAP must meet all "required" criteria and then the trust level score will be calculated based on sum of weights of other non-required criteria that are met. Authentication requests can then specify required trust level or explicitly request criteria that are required before a request can be fulfilled by a CAP. Authentication requests can also require a specific CAP to fulfil a request. Required trust levels or specific required criteria that CAPs must meet may be risk driven. For example, if a required transaction is deemed risky (opening accounts, withdrawing large sums of money, etc) then the customer authentication consumer may request a high trust level requirement or request biometric authentication specifically, etc.

When authentication is required for a transaction, risk based trust scores can be requested by the Customer Authentication Consumer (CAC). Not all transactions or interactions are of equal risk (from a financial fraud perspective). If a customer simply needs to sign up for a newsletter, or join a customer survey, etc—those are extremely low risk transactions. As such, authentication requests for those types of transactions may require a very low trust score. However, if a customer asks to withdraw large amounts of cash or close/open accounts—those are high risk transactions and may require a high trust score provider. The system and/or operator may determine which trust level is required prior to issuing a customer authentication request or after issuing an initial authentication request. Various transaction types, or perhaps even whole points of interaction (such as branch or ATM) may be pre-assigned risk levels and may drive required trust levels from CAPs.

Once a CAP trust level requirement is established, an identity of an individual can be authenticated as described above. A CAC may produce a customer authentication request and specify required trust score. Optionally the CAC may go further and specify actual attributes that a provider must have, like MFA. When CAPs look/monitor for requests to fulfil, they may filter based on trust level that they can fulfil—i.e. their own trust level should be equal to or higher than the requested score in the customer authentication request. Further, once a provider is fulfilling the request, their trust score may be verified again by the API to make sure that it matches or surpasses that of the requested one.

Figure 4:
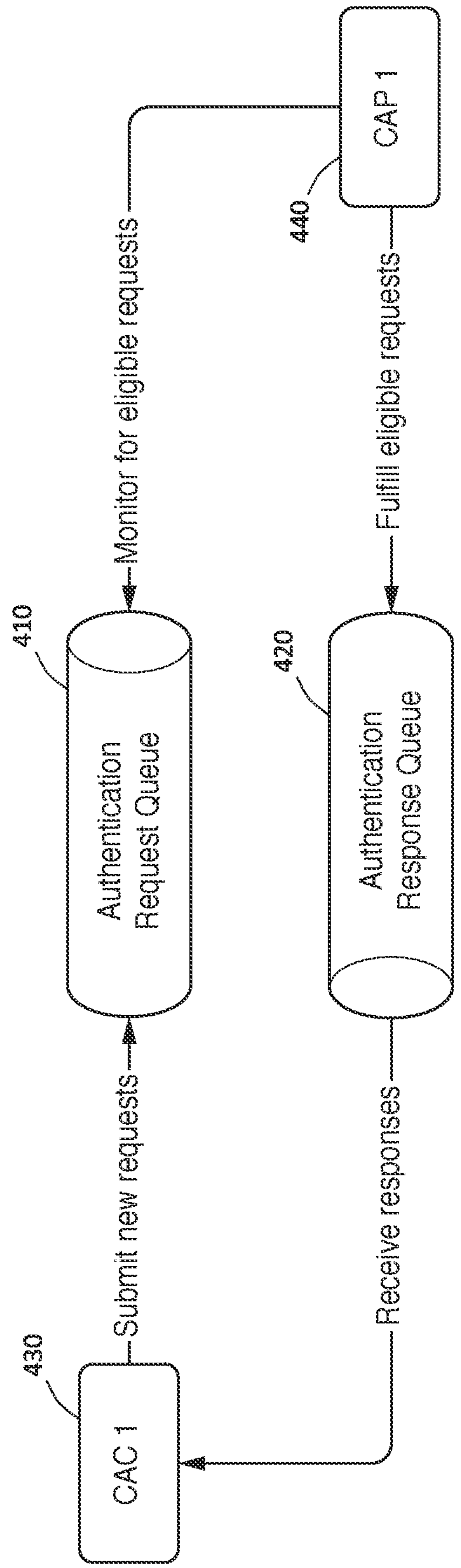
FIG. 4 illustrates authentication request and response queues.

FIG. 4 illustrates authentication request queue 410 and an authentication response queue 420. As described above, once an authentication request is generated and transmitted to the CSP by a CAC 430, the request is added to the request queue 410. One or more CAPs 440 can monitor the request queue and fulfil outstanding requests. When the requests are fulfilled by a CAP, an authentication response is prepared and transmitted to the authentication response queue 420. The authentication response is then transmitted to the CAC 430 that generated the initial request. This results in the identity of an individual wishing to perform a transaction to be authenticated.

Figure 5:
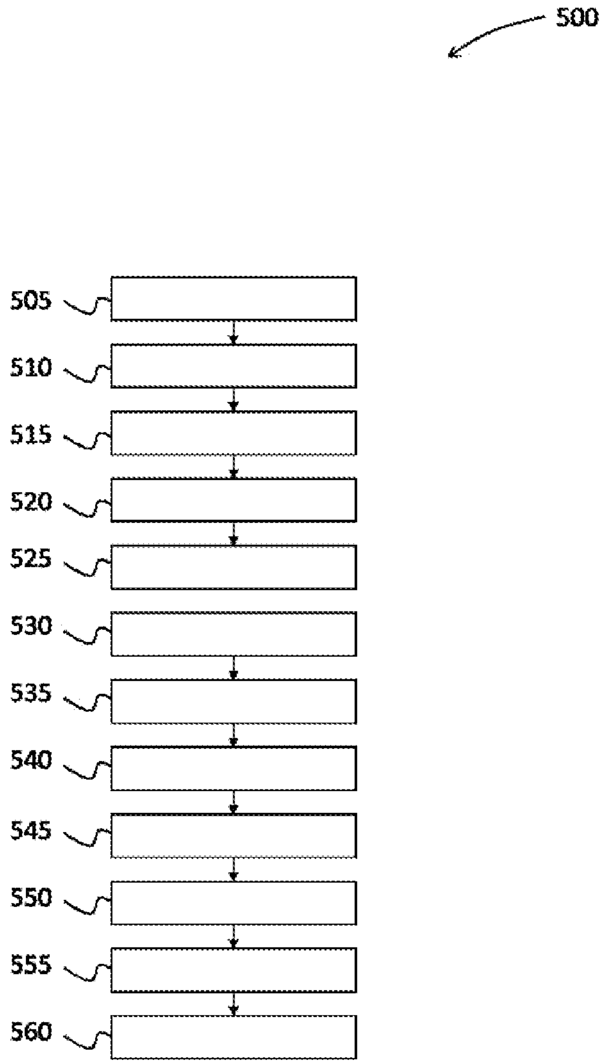
FIG. 5 illustrates a flowchart of certain steps taken for generating an authentication request.

FIG. 5 illustrates a flowchart 500 outlining a methodology for generating an authentication request for authenticating an identity of an individual during a transaction. Firstly, in a step 505, an authentication provider module is executed on a computing device that is external to a trusted computing system (i.e., it is part of a non-trusted computing system). The authentication provider module is configured to authenticate the identity of the individual independently of the trusted computing system. More than one such authentication provider module may be executed in this way. Then, in a step 510, a trusted identity provider module is executed on a computing device (e.g., a server) of the trusted computing system. The identity provider is configured to issue authentication credentials for components of the trusted system as well as components of the non-trusted system. When an authentication provider module wishes to pre-register itself with the trusted computing system, the authentication provider transmits, in a step 515, some data that indicates what its' attributes are to the identity provider module of the trusted system. The identity provider module then determines in a step 520 whether the attribute(s) of the authentication provider module meets certain predetermined eligibility criteria for the authentication provider. For example, to be eligible for use as an authentication provider, the authentication provider may need to enforce minimum password difficulty requirements when user's login. The data associated with the attribute that is transmitted may thus be whether the authentication provider enforces this. Other attributes may of course be utilised for determining eligibility. For example, the trusted system may require the use of multi-factor authentication via biometrics or may require the authentication provider to offer location information or the like to enable the authentication provider to be eligible as an authentication provider. Typically, some attributes of the authentication provider are used to determine eligibility and the remaining attributes are used to determine a trust level score (i.e., a score relative to other providers indicating how much trust can be placed in the particular authentication provider-a higher score representing a higher degree of trust). A first subset of attributes may thus be used to determine eligibility and a second subset of attributes may be used to determine a trust level score. Once an authentication provider module has been deemed eligible, a trust level score can then be calculated in a step 525. This may be achieved by providing a weighting for each of the second subset of attributes in a strep 530. This may be achieved automatically via the identity provider module or may be performed manually. As an example, there may be three types of weighting: high, medium and low. It will be appreciated that there may be more than three types of weighting according to certain other embodiments of the present invention. The high weighting category may be attributes which are given a score of between 20-40. The medium weighting category may be attributes which are given a score of between 10-19. The low weighting category may be attributes which are given a score of between 0-9. The deemed importance of the attribute may determine what score it is given. For example, if the authentication provider offers biometric multi-factor authentication or is internal to NCR these attributes may be given a "high" weighting. If the authentication provider offers geolocation information for the individual (e.g., location data for the mobile device being used by the individual), this attribute may be given a "medium" weighting. If the authentication provider offers non-biometric MFA (e.g., via SMS or email) or requires regular re-authentication (i.e., after a timeout period), these attributes may be given a "low" weighting. The overall trust level score is then provided by summing the individual weightings in a step 535. Then, the identity provider module provides the authentication provider module with authentication credentials in a step 540. These credentials may include information about the attributes of the authentication provider together with its' trust level score (as previously calculated). These credentials are stored in a memory associated with the identity provider module. After the credentials have been created, the authentication provider module may send a request to the identity provider module for an authentication token (which it can use to authenticate itself with the trusted system). The identity provider module then checks the stored credentials to authenticate the authentication provider module. If the authentication provider module is authenticated, the identity provider module transmits an authentication token to the authentication provider module in a step 545. The token may include details about the attributes as well as the trust level score as previously calculated. This token can then be used to authenticate the authentication provider with the trusted system. For example, the token may be sent to a server of the trusted system to thereby pre-register the authentication provider with the trusted system. A number of authentication providers may pre-register in this way and data indicating a list of available authentication providers that are able to fulfil authentication requests is stored in a memory of the server. After registration, the authentication provider may then continuously transmit pings to the server to indicate the authentication provider is available to fulfil authentication requests. The authentication provider may also provide the authentication token to the server each time it needs to authenticate itself with the trusted system. Following the pre-registration of the authentication provider modules, when a customer approaches a computing device (such as an ATM or a device operated by a bank teller) and requests cardless authentication, the following steps take place. Firstly, in a step 550, the computing device detects an input event indicating that the individual wishes to authenticate their identity via a cardless authentication process. This may for example be achieved by the individual or bank teller selecting a cardless authentication icon on a user interface of the computing device. Since cardless authentication is requested, an authentication request to enable this authentication to be performed needs to be generated. This request should have certain properties which may depend on the nature of the transaction. Thus, in a next step 555, the computing device determines at least one property that should be included when generating the authentication request. There are various possible properties that can be determined. For example, a request identifier may be needed when the authentication is taking place at an ATM or kiosk. This is because the authentication provider makes use of the request identifier in order to fulfil the authentication request (e.g., after the user scans a QR code on the display of the ATM). This request identifier may be obtained from the server. For example, before generating the request, the computing device may transmit a request for a new request identifier to the server and subsequently receive the request identifier. Another property that may be needed is a terminal identifier. This may be needed to help keep track of which device generated the original authentication request. This terminal identifier may be stored in memory of the computing device for access when needed. Another property may also be a date and time of expiry of the authentication request. This helps to ensure old requests are not fulfilled by authentication providers which could be a security concern. The expiry date/time is typically a preset time period after the requests is generated. Another property that can be determined (simultaneously with generation of the request) is the date and time of generation of the request. Another property that may be needed is a customer identifier. For example, when authenticating at an in-branch teller, the customer identifier may be used to determine which device notifications should be sent to when authenticating the individual. The customer identifier may be obtained after inputting information about the individual into the user interface of the computing device. If the individual has chosen a specific authentication provider to use (e.g., the backend associated with their banking app), then the request may also contain a property of an identifier for the authentication provide module the customer wishes to use. This identifier may be obtained by the computing device sending a request to the server for the identifier (the identifier is stored in the registry on the server). Other properties of the authentication may include certain required attributes the authentication provider module performing the authentication must have (e.g., the ability to perform biometric multi-factor authentication or the capability to provide geolocation information for the individual), a minimum required trust level score (as discussed hereinabove) that the authentication provider performing the authentication must have or certain required actions that the authentication provider module performing the authentication must take (e.g., perform biometric MFA, require password input). The attributes, score and required actions that should be taken can be determined based on the type of transaction being performed and also the type of terminal performing the transaction (e.g., ATM, kiosk, teller device etc.). Riskier transactions may require a higher score and a greater number of required attributes and actions. If no attributes are specified and a score of 0 is specified than any authentication provider module can pickup the request. Once the properties that should be included in the authentication request are determined, an authentication request including data indicative of these properties is generated in a step 560. The generated authentication request can then be transmitted to the server where it can be advertised to pre-registered authentication provider modules. One of the authentication provider modules can then fulfil the authentication request to enable authentication of the identity of the individual.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The invention claimed is:

1. A computer-implemented method for generating an authentication request for authenticating an identity of an individual, the method comprising:

detecting, by a computing device of a trusted computing system, an input event indicating that an individual at the computing device wishes to authenticate their identity;

responsive to said detecting, determining, by the computing device, at least one property for an authentication request for use by an authentication provider module on a non-trusted computing system that is coupled to a separate mobile device of the individual and to the trusted computing system, the authentication provider module performing authentication of the identity of the individual independently of the trusted computing system; and responsive to said determining, generating, by the computing device, the authentication request, wherein the authentication request comprises data indicative of said at least one property.

2. The method as claimed in claim 1, further comprising: determining a request identifier for the authentication request as one property of said at least one property.

3. The method as claimed in claim 2, further comprising: determining the request identifier by receiving the request identifier from a server of the trusted computing system.

4. The method as claimed in claim 1, further comprising: determining a terminal identifier of the computing device as one property of said at least one property.

5. The method as claimed in claim 4, further comprising: determining the terminal identifier by querying a memory of the computing device for the terminal identifier.

6. The method as claimed in claim 1, further comprising: determining a date and time of expiry for the authentication request as one property of said at least one property.

7. The method as claimed in claim 6, further comprising: determining the date and time of expiry as a predetermined time period after generating the authentication request.

8. The method as claimed in claim 1, further comprising: determining a customer identifier for the authentication request as one property of said at least one property.

9. The method as claimed in claim 8, further comprising: determining the customer identifier responsive to inputting information associated with the individual into a user interface of the computing device.

10. The method as claimed in claim 1, further comprising: determining an authentication provider module identifier as one property of said at least one property.

11. The method as claimed in claim 10, further comprising:

determining the authentication provider module identifier responsive to inputting an indication of a selected authentication provider module into a user interface of the computing device.

12. The method as claimed in claim 1, further comprising: determining at least one required attribute as one property of said at least one property.

13. The method as claimed in claim 12, further comprising:

determining the at least one required attribute as one or more of:

the authentication provider module is provided by a same entity as the trusted computing system;

the authentication provider module requires a minimum password difficulty for authentication of the identity of the individual;

the authentication provider module is able to perform multi-factor authentication of the identity of the individual; and the authentication provider module is able to provide geolocation information for the individual.

14. The method as claimed in claim 12, further comprising:

determining the at least one required attribute based on a type of transaction being performed at the computing device and/or a type of the computing device.

15. The method as claimed in claim 1, further comprising: determining a minimum required trust level score as one property of said at least one property.

16. The method as claimed in claim 1, further comprising: determining at least one required action to be performed by the authentication provider module during authentication of the identity of the individual as one property of said at least one property.

17. The method as claimed in claim 16, further comprising:

determining the at least one required action as one or more of:

the authentication provider module must require input of a password; and the authentication provider module must perform multi-factor authentication.

18. The method as claimed in claim 1, further comprising: detecting the input event comprises receiving a selection by the individual or a bank teller on a user interface of the computing device.

19. A communication network, comprising:

a trusted computing system comprising a computing device;

a non-trusted computing system comprising an authentication provider module executing on a computing device that is coupled to a separate mobile device of the individual and to the trusted computing system, the authentication provider module configured to perform authentication of an identity of the individual independently of the trusted computing system;

wherein the computing device is configured to:

detect an input event indicating that an individual at the computing device wishes to authenticate their identity;

determine at least one property for an authentication request for use by the authentication provider module in authenticating the identity of the individual independently of the trusted computing system; and generate the authentication request, wherein the authentication request comprises data indicative of said at least one property.

20. The communication network as claimed in claim 19, wherein the computing device is an Automated Teller Machine or Self-Service Terminal or kiosk or is a desktop computer, laptop, or mobile device operated by a bank teller.

* * * * *